(12) United States Patent
Yamasaki (10) Patent No.: US 8,452,045 B2
(45) Date of Patent: May 28, 2013

(54) IMAGE PROCESSING METHOD FOR GENERATING EASILY READABLE IMAGE

(75) Inventor: Shozo Yamasaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 901 days.

(21) Appl. No.: 12/330,513

(22) Filed: Dec. 9, 2008

(65) Prior Publication Data

US 2009/0154763 A1 Jun. 18, 2009

(30) Foreign Application Priority Data

Dec. 12, 2007 (JP) ................. 2007-321282

(51) Int. Cl.
*G06K 9/00* (2006.01)
*G06K 9/32* (2006.01)
*H04N 1/40* (2006.01)

(52) U.S. Cl.
USPC ............................ 382/100; 382/298; 358/449

(58) Field of Classification Search .................. 382/100, 382/298, 284, 182, 306, 180; 395/779, 788, 395/774; 345/156, 472, 472.1
See application file for complete search history.

(56) References Cited

U.S. PATENT DOCUMENTS

| 5,701,500 | A | * | 12/1997 | Ikeo et al. | ...................... 715/209 |
| 7,417,619 | B2 | * | 8/2008 | Broussard | ...................... 345/156 |
| 2002/0131651 | A1 | * | 9/2002 | Anantharamu et al. | ...... 382/284 |

FOREIGN PATENT DOCUMENTS

| JP | 2-58158 A | | 2/1990 |
| JP | 2002-374400 | * | 12/2002 |
| JP | 2004-303105 A | | 10/2004 |
| JP | 2005-223824 A | | 8/2005 |

OTHER PUBLICATIONS

NPL-A Guide to MATLAB for Beginners and Experienced Users—Hunt Lipsman & Rosenberg, published 2001.*
NPL—Mar. 2007—GNU Plot with example of Margin setting.*
Japanese Office Action dated Nov. 4, 2011 issued in corresponding Japanese Patent Application No. 2007-321282.

* cited by examiner

*Primary Examiner* — Chan S Park
*Assistant Examiner* — Ha Le
(74) *Attorney, Agent, or Firm* — Fitzpatrick, Cella, Harper & Scinto (57) ABSTRACT

A character area is detected in a reduced layout and a character is detected in the character area, and a character size is compared to a predetermined size readable by a user when characters are printed. A detected character size determined to be smaller than the predetermined size is enlarged. An object adjacent to the detected character in an original document is detected and a content of the objects is determined. A layout position in which a relationship between the enlarged detected characters and the objects is kept is determined according to the determined content and the enlarged characters are arranged. The whole document can be output automatically in an easily viewable state while keeping a meaningful layout relationship between the objects.

5 Claims, 13 Drawing Sheets

IMAGE PROCESSING METHOD FOR GENERATING EASILY READABLE IMAGE

BACKGROUND OF THE INVENTION

1. Field of the Invention

The present invention relates to an image processing, and particularly relates to an image processing method with a function for generating an easily readable image.

2. Description of the Related Art

Conventionally, there has been known a digital copier which lays out a plurality of original documents with the same size on an image memory according to a size of an output sheet and prints out the documents (with a reduced layout).

A method of using the digital copier is to perform the setting on a size of original documents desired to be copied, on a size of the output sheets, and on the number of original documents desired to be collected and output for one output sheet and to perform a copy.

However, there is the possibility that when characters of the original documents are small or when a number of pages are collected into one page, since a reduction rate increases in performing a reduced layout, characters after the output are too small to read.

In order to solve this problem, it is considered that techniques disclosed, for example, in Japanese Patent Laid-Open No. 2002-374400 are used. That is, it is considered that whether characters with small size (or a character string including a plurality of characters) are included in the document is automatically determined, if the characters are included in the document, only a portion in which the characters are included is enlarged to a predetermined size and the whole document is formed to be easily read.

However, the techniques disclosed in Japanese Patent Laid-Open No. 2002-374400 take notice only of making characters in the document recognizable and therefore, relevance to other objects is not shown in the publication. As a result, in a character object which needs to be arranged corresponding to a graphic object such as a character and a graph scale in a figure and table, a positional relationship between both the objects collapses and the character object reappears as a meaningless layout.

In view of the foregoing, it is an object of the present invention to provide an image processing method capable of outputting the whole document automatically in an easily viewable state while keeping a meaningful layout relationship between both objects.

SUMMARY OF THE INVENTION

The present invention provides an image processing apparatus, which comprises detection means for detecting a character image included within an original document image and a size of the character image, determination means for determining whether or not a size of the detected character image is smaller than a predetermined size, enlargement means for enlarging a size of the character image determined to be smaller by the determination means, and layout means for determining a layout position of the enlarged character image by the enlargement means, when an object adjacent to the character image is a graph, so that a content shown by the graph may be distinguished.

When a character which is extremely small in size and not recognizable in printing is determined and enlarged to that of a recognizable size, a relationship between an adjacent object and the character is determined from a content of the object and a character size is enlarged while keeping the relationship. Therefore, even in a meaningful character in a positional relationship with the graphic object such as a character and a graph scale in a figure and table, a character size can be enlarged while keeping the layout.

Further features of the present invention will become apparent from the following description of exemplary embodiments (with reference to the attached drawings).

DESCRIPTION OF THE EMBODIMENTS

First Embodiment

1. Configuration of Image Processing System

Figure 1:
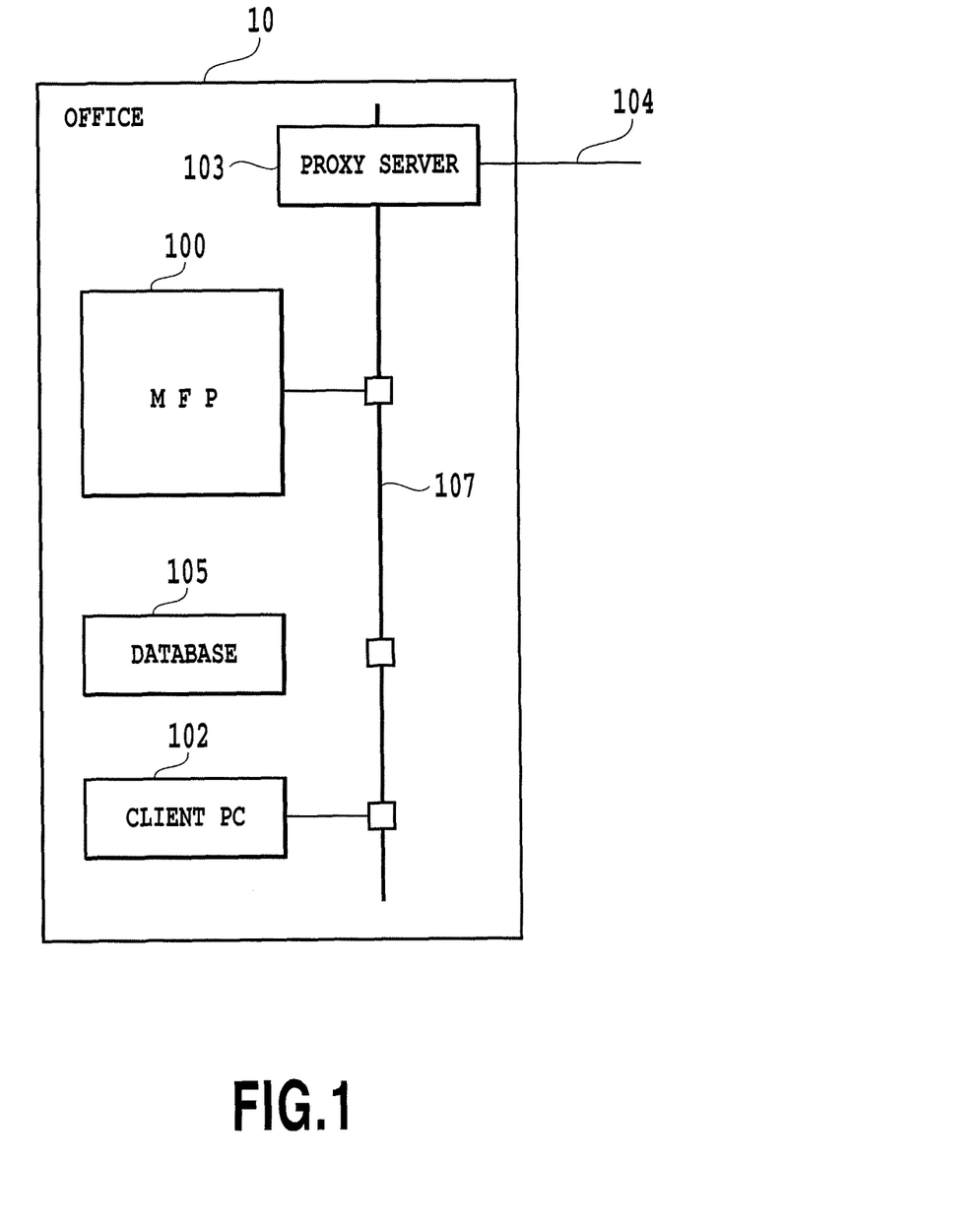
FIG. 1 is a block diagram showing a configuration of an image processing system according to a first embodiment.

FIG. 1 is a block diagram showing a configuration of an image processing system according to a first embodiment of the present invention.

This image processing system is realized in an environment in which an office 10 is connected to a network 104 such as the Internet.

To a LAN 107 which is constructed in the office 10, there are connected several devices including an MFP (Multi Function Peripheral) 100 which is a complex machine for realizing a plurality of types of functions (a copying function, a printing function, and a transmitting function). That is, in addition to the MFP 100, a client PC 102, a database 105, and a proxy server 103 using the MFP 100 are connected to the LAN 107.

The LAN 107 in the office 10 is connected to the network 104 via the proxy server 103 of each office.

A configuration shown in FIG. 1 is one example according to the present invention and a plurality of offices may be present. Further, the network 104 may be typically any one of the Internet, a LAN, a WAN, a telephone line, a dedicated digital line, an ATM, a frame relay line, a communication satellite line, a cable television line, a radio communication line for data broadcasting. Alternatively, a so-called telecommunication network realized by a combination thereof may be preferable and further data may be transmitted and received.

Further, various terminals of the client PC 102 has standard components mounted on a general-purpose computer (e.g., a CPU, a RAM, a ROM, a hard disk, an external storage device, a network interface, a display, a keyboard, and a mouse), respectively.

Hereinafter, a detailed configuration of the MFP 100 will be described with reference to FIG. 2.

Figure 2:
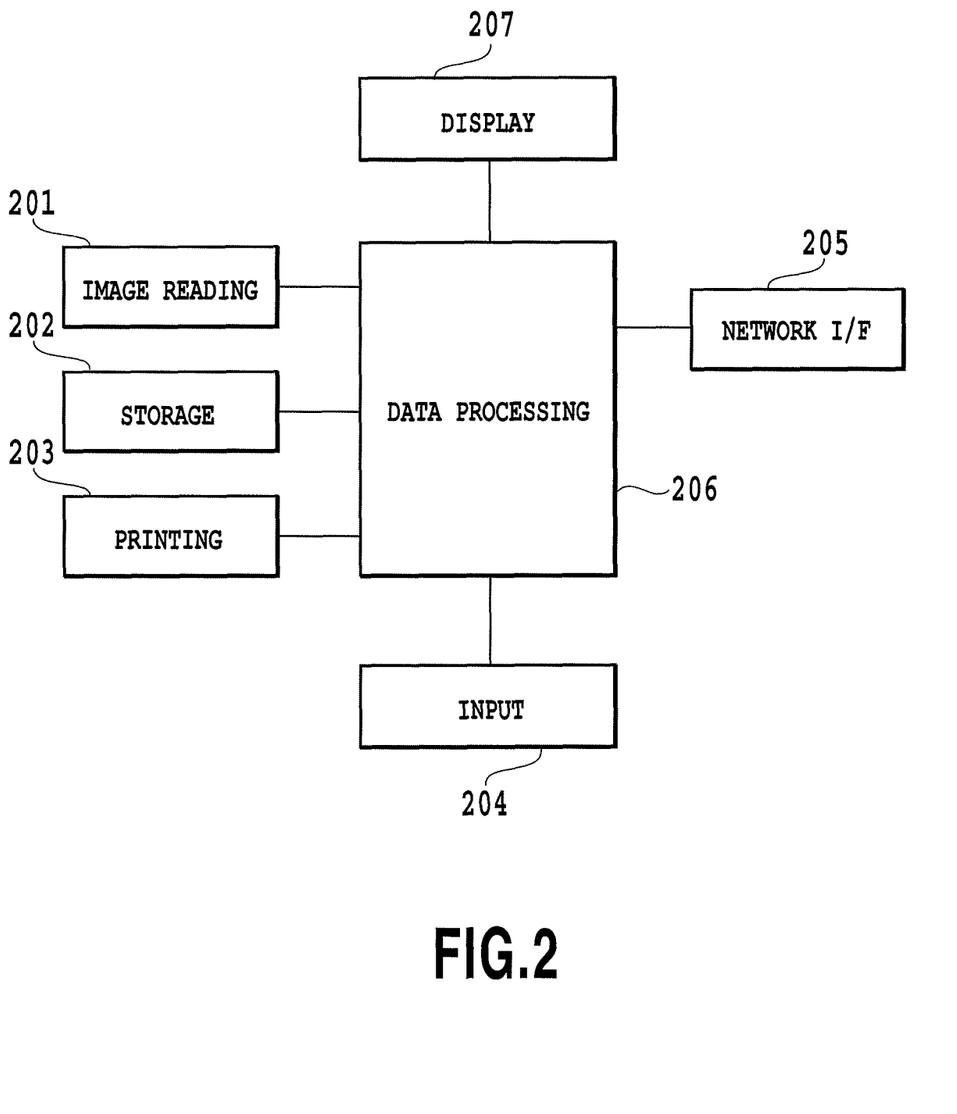
FIG. 2 is a block diagram showing a detailed configuration of an MFP according to the first embodiment.

FIG. 2 is a block diagram showing a detailed configuration of the MFP 100 according to the first embodiment of the present invention.

Referring to FIG. 2, an image reading section 201 including an automatic document feeder (ADF) irradiates images on a batch of documents or on one document with a light source (not shown). Then, a reflected image from the documents is formed on a solid image sensor by a lens and a bit-map shaped image read signal is obtained from the solid image sensor as bit map data with predetermined resolution (600 dpi and the like).

Further, the MFP 100 has a copying function for printing an image corresponding to the image read signal on a recording medium by a printing section 203. When one document image is copied, this image read signal is subjected to an image processing by a data processing unit 206 to thereby generate a recording signal. Then, the signal is printed on the recording medium by the printing section 203. On the other hand, when a plurality of document images is copied, the recording signals for each page are stored and kept once in a storage device 202. Then, the signals are sequentially output to the printing section 203 and printing is performed on the recording medium.

Further, in a communication function via the network I/F 205, bit-map data obtained from the image reading section 201 is converted to object data by the below-described processing for transmission to the database 105. Alternatively, the object data stored in the database 105 is received for reuse, and further, the object data is converted to an image file with a vector data file format such as XPS and PDF to be transferred to the client PC 102.

In the printing function by the printing section 203, for example, printing data output from the client PC 102 is received via the network I/F 205 by the data processing unit 206. Subsequently, the data processing unit 206, after converting the printing data to a recording signal printable with the printing section 203 by an internal image processor, forms images on printing mediums by the printing section 203.

An instruction of an operator to the MFP 100 is performed from an input section 204 mounted on the MFP 100, and apparatus operations according to these instructions are controlled by a controller (not shown) within the data processing unit 206. Further, a state display according to an operation input and a display of the image data during processing are performed by a display device 207.

The storage device 202 includes a storage area for storing object data obtained by the below-described processing, an area for keeping as a table the characteristic quantity for the below-described document size and observation distance, and a buffer for an image processing used during various image processes in the data processing unit 206. The storage device 202 further includes a buffer for editing images for storing, as data for editing images, data obtained by copying the object data when editing images based on the object data.

The data processing unit 206 has a CPU, a ROM, a RAM and an image processor, and loads and stores a control program and data according to the present embodiment.

Figure 3:
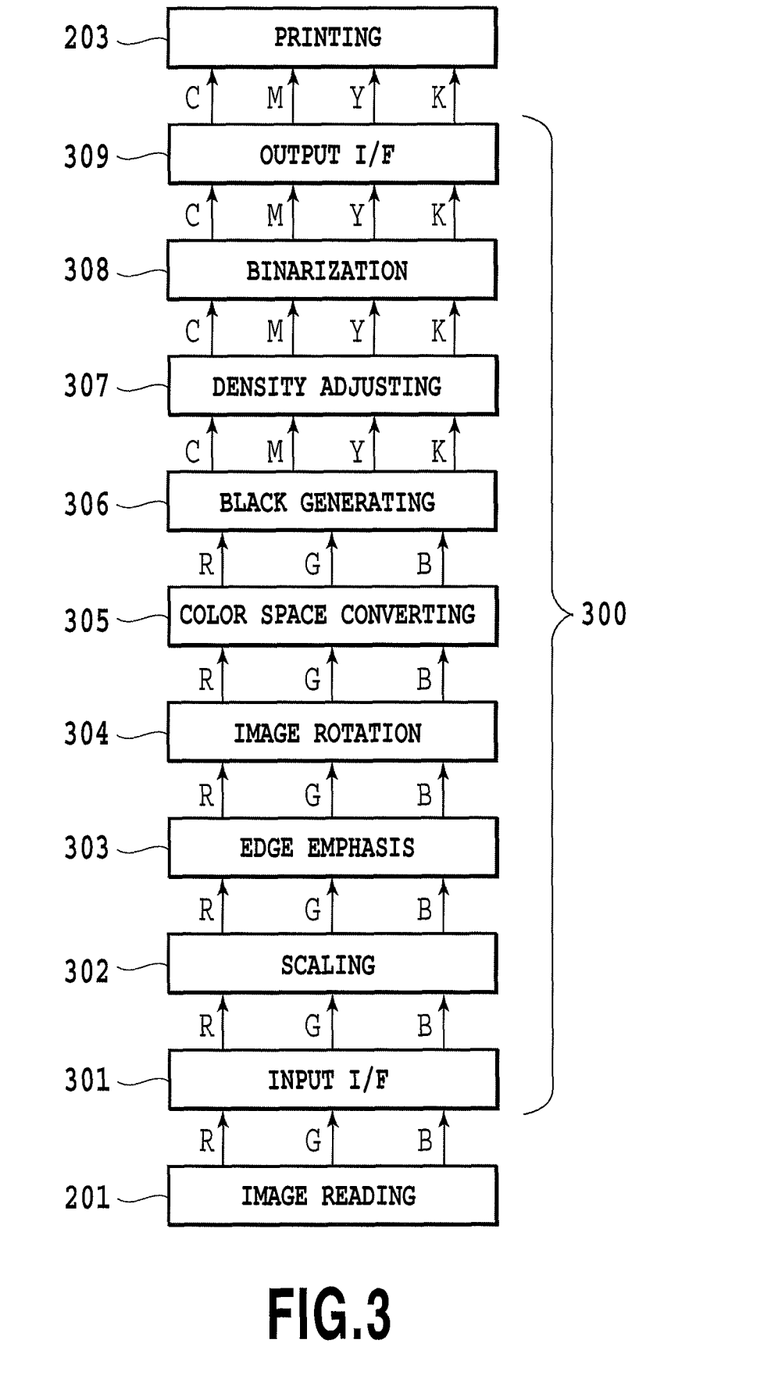
FIG. 3 is a block diagram showing a configuration of an image processing unit according to the first embodiment.

Hereinafter, FIG. 3 shows a detailed content of the image processor 300 within the data processing unit 206.

In the present embodiment, as one example, RGB multi-valued image data input from the image reading section 201 is converted to binary image data of CMYK (cyan, magenta, yellow and black) and is output by the printing section 203.

An input interface 301 receives image data input from the image reading section 201 and converts the data according to an internal processing. In the present embodiment, the RGB multi-valued image data is input.

A scaling section 302 performs resolution conversion on the input RGB multi-valued image data according to the resolution of a printer for output and the size of a paper to be output, thereby performing an expansion and reduction processing.

An edge emphasis section 303 performs a sharpness processing and a smoothing processing.

An image rotation processor 304 stores images in a built-in memory once and processes an image to be rotated by 90 degrees when outputting image data input in a vertical position according to output sheets in a horizontal position.

A color space converting section 305 performs a processing when it is necessary to convert color space of input image data to another color space. In the present embodiment, LOG conversion is performed on RGB image data input from a scanner and the image data is converted to CMY color space data to be output by the printer.

A black generating section 306 extracts a minimum value of CMY as a K signal value.

An output color density-adjusting section 307 adjusts color taste and adjusts density of each of the colors by adjusting each value of CMYK in accordance with characteristics of the printer.

In the present embodiment, for the purpose of creating data for color binary printer output, a binarization processing section 308 performs a binary conversion processing such as a random dithering to thereby output a binary signal with each one bit of CMYK.

An output interface 309 acts as an interface to the printing section 203. In the present embodiment, the CMYK binary image data is output.

It is assumed that all of the settings and the operations of each of the processing sections are controlled by control signals output from a CPU within the data processing unit 206. All of the setting of variable magnification of the scaling section 302, the coefficient of filtering of the edge emphasis section 303, the presence or absence and angle of rotation of the image rotation processor 304, and the processing method of the binarization processing section 308 are controlled by the control signals output from the CPU.

2. Overview of Image Processing

An outline of the entire image processing including an image processing method according to the present invention realized in the image processing system shown in FIG. 1 will be described below with reference to FIG. 4.

Figure 4:
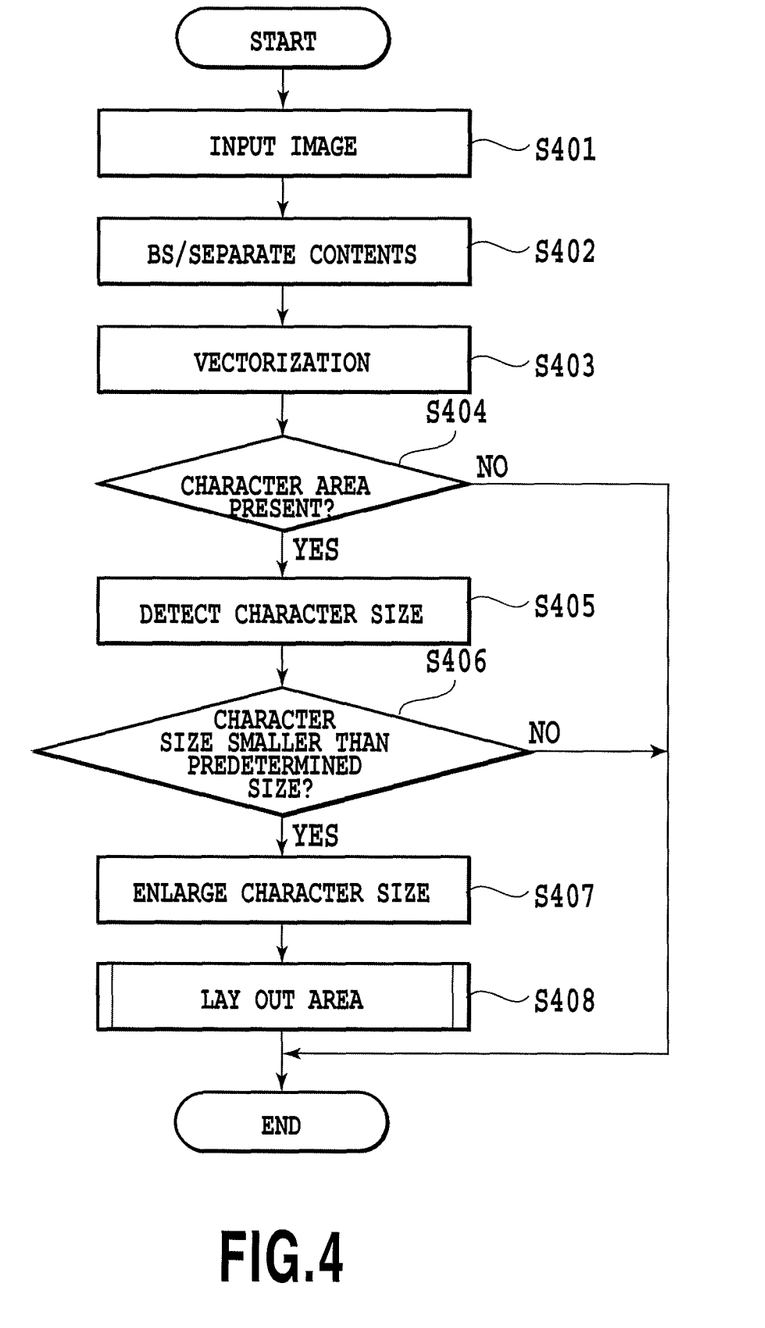
FIG. 4 is a flowchart of a process of the image processing system according to the first embodiment.

FIG. 4 is a flowchart showing an outline of the entire process performed by the image processing system according to the first embodiment of the present invention.

In step S401, first, the image reading section 201 of the MFP 100 scans and reads an original document in a bitmap state to obtain an image signal with 600 dpi and 8 bits, for example. The image signal is preprocessed in the data processing unit 206 and the processed image signal is stored in the storage device 202 as image data (bitmap data) corresponding to one page.

Next, in step S402, when input image signals are scanned data, the data processing unit 206 performs a process for dividing them into areas for each attribute (block selection (BS)) to perform a content separation process (area division process). Specifically, first, the process divides the image signal to be processed, which is stored in the storage device 202, into a character/line drawing area and a half-tone image area. The character/line drawing area is further divided into blocks collected as a lump for every paragraph or into tables or graphics drawn by lines, and these are used as a character object or a line drawing object.

On the other hand, the half-tone image area is divided into so-called independent objects (blocks) for each block, such as image areas or background areas separated in a rectangular shape.

In the present embodiment, examples of the attributes include TEXT (character), GRAPHIC (line, graphic and table), and IMAGE (image); however, types of the attributes are not limited thereto. Another type of the attribute can be used according to the application or purpose, alternatively, all the attributes need not be used.

Next, in step S403, the vectorization processing is performed for each separated object. In this vectorization processing, character recognition is first performed by OCR for the object determined to be a TEXT attribute. Further, the process recognizes the size, style, and character style (font) of characters and converts the recognized data into font data visibly close to the character obtained by scanning the original document. On the other hand, the object having tables and graphics structured by lines of the GRAPHIC attribute is converted to vector data by using a technique for outlining and a technique of function approximation. Further, the image object having Image attribute is subjected to individual JPEG compression as image data. In the present embodiment, the TEXT object is subjected to OCR processing to thereby convert characters to the vector data; however, the embodiment is not limited thereto. An outline of the character image may be functionally approximated to be converted into the vector data.

The vectorization processing to various types of these objects is performed based on the information of each object and stored as the object data of the format including the below-described meta data and image information usable within the MFP 100. Further, layout information of each of the objects is stored.

Next, in step S404, it is determined whether or not the character area is included, and if the character area is not included, the process in the image processing system is terminated.

On the other hand, in step S405, if the character area is included, a character size for each character area included in the document image is detected. Further, in step S406, it is determined whether the size of the detected character (detection character) is larger or smaller than that of the predetermined character previously stored in the data processing unit 206. If an area including characters with the size smaller than the predetermined character size is not present, the process in this image processing system is terminated.

On the other hand, in step S407, if the area including the character with the size smaller than that of the predetermined character is present, the characters are enlarged to the same size as that of the predetermined characters in the entire area including the characters with the size smaller than that of the predetermined characters. Here, characters adjacent to each other are enlarged in the range recognizable by users.

Next, in step S408, the layout arrangement of the area of character to be enlarged is determined by the below-described layout determination method. Then, the character area and the area other than the characters are synthesized to generate the synthesized image.

3. Layout Determination Process

Contents of the layout determination process shown in step S408 according to the present invention will be described below.

Figure 5:
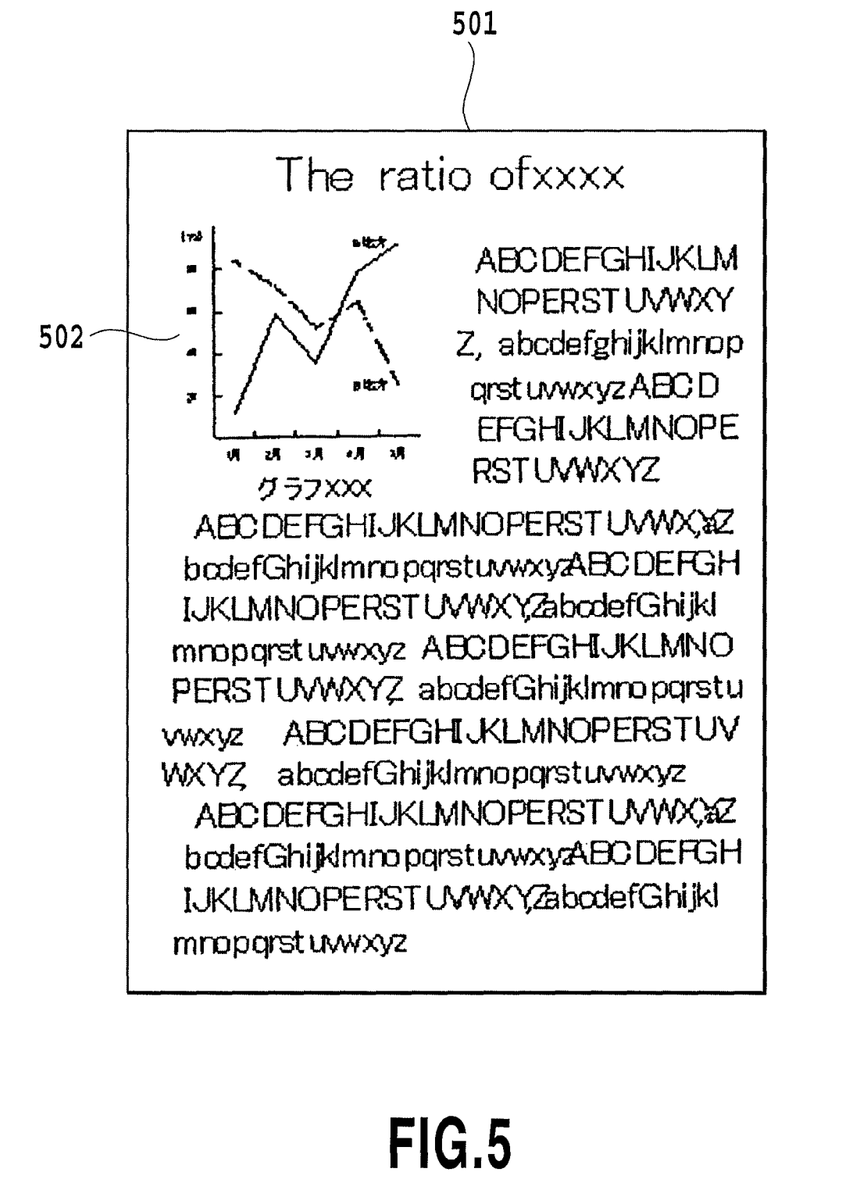
FIG. 5 is a view showing one example of image data read by an image reading section according to the first embodiment.
Figure 6:
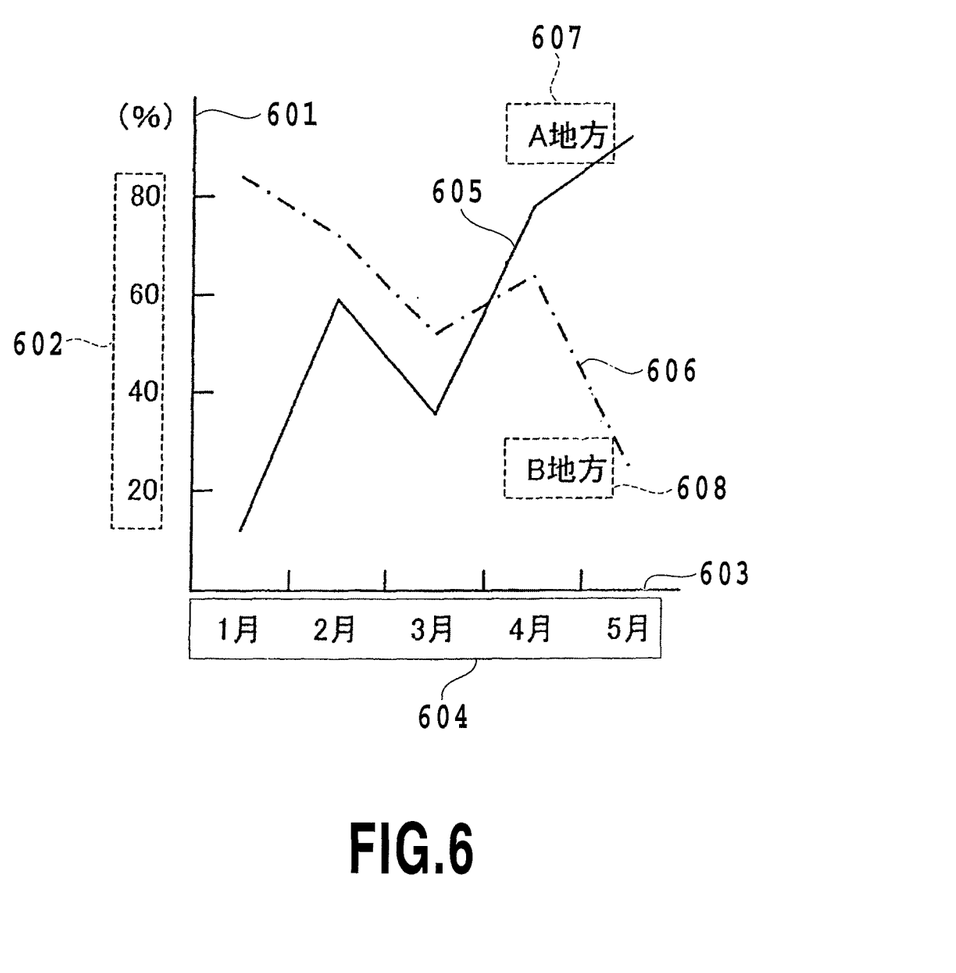
FIG. 6 is a view showing one example of a graphic area according to the first embodiment.

FIG. 5 shows an example in which the image data 501 read by the image reading section 201 includes a graphic area 502. As shown in FIG. 6, the graphic area 502 includes a vertical axis 601, a vertical axis unit (scale of the vertical axis) 602, a horizontal axis 603, a horizontal axis unit (scale of the horizontal axis) 604, polygonal lines 605 and 606, and items 607 and 608.

Here, it is assumed that the character size in each unit composing the horizontal axis unit 604 is smaller than the predetermined character size in displaying (or printing) the characters on the image data 501, and moreover, it is difficult for users to recognize the character type. Contents of the layout determination process when enlarging the character size in the horizontal axis unit 604 will be described below with reference to the flowchart of FIG. 7.

Up to step S408 (FIG. 4), the vertical axis 601, the horizontal axis 603, and the polygonal lines 605 and 606 are recognized as a line drawing object of GRAPHIC and further, the vertical axis unit 602, the horizontal axis unit 604, and the items 607 and 608 are recognized as TEXT.

Figure 7:
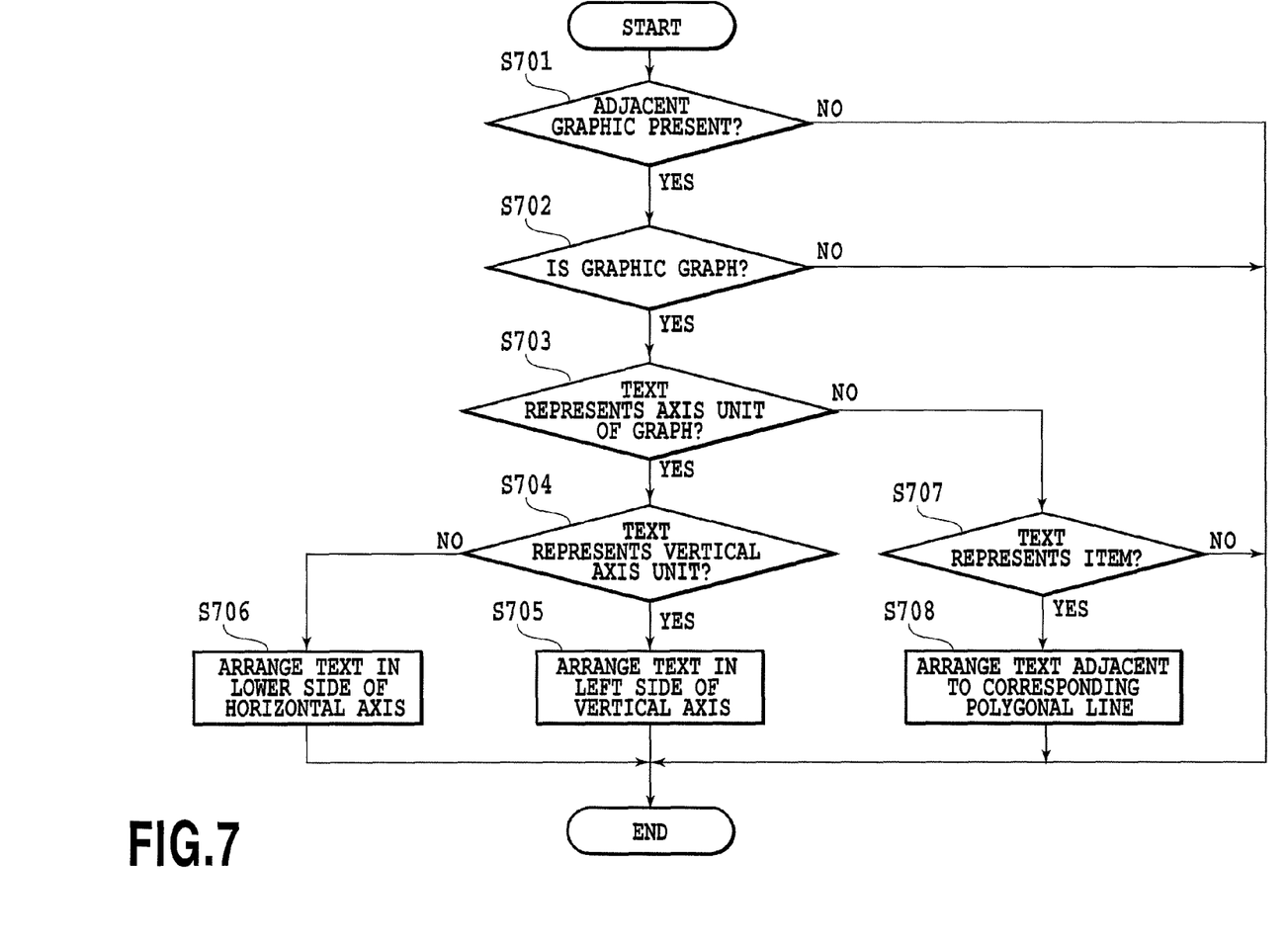
FIG. 7 is a flowchart of a layout determination process according to the first embodiment.

Referring to FIG. 7, in step S701, it is determined first whether or not GRAPHIC adjacent to the character with the size smaller than that of the predetermined character is present. Whether the GRAPHIC adjacent to the character is present can be determined based on whether or not the GRAPHIC is present within the predetermined distance from the character, which is previously stored in the data processing unit 206. If the GRAPHIC adjacent to the character is not present, this layout determination process is terminated.

Figure 8:
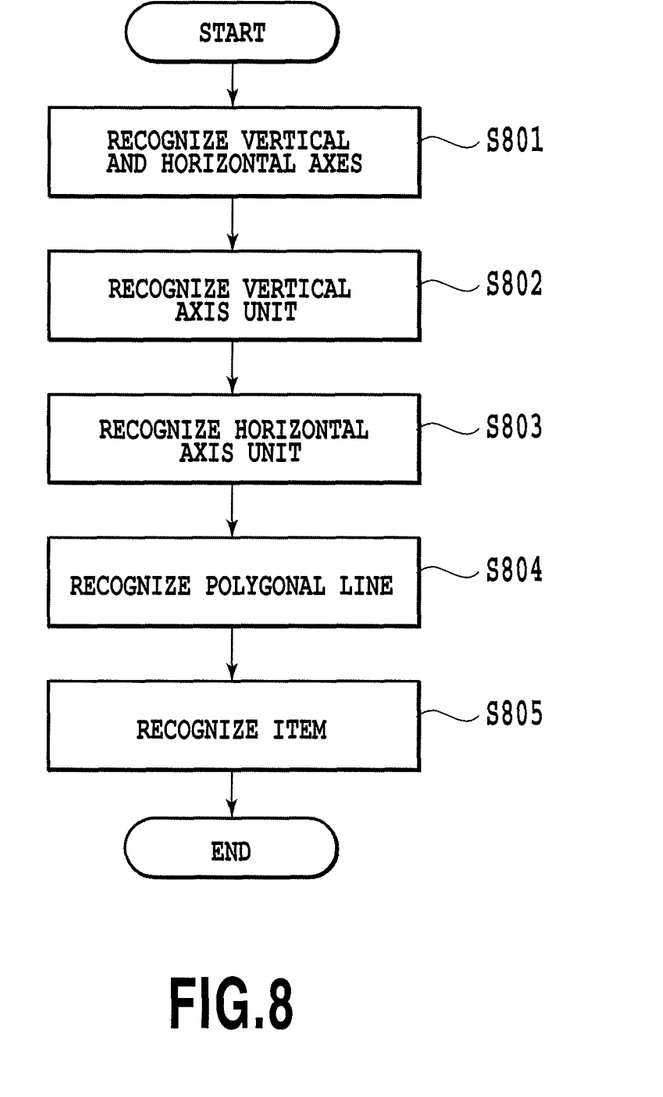
FIG. 8 is a flowchart of a graphic determination process according to the first embodiment.

On the other hand, in step S702, if the GRAPHIC adjacent to the character is present, it is determined whether or not the GRAPHIC adjacent to the character is a graph by the graphic determination process shown in the below-described FIG. 8. If the GRAPHIC adjacent to the character is not a graph, this layout determination process is terminated.

On the other hand, in step S703, if the GRAPHIC adjacent to the character is a graph, it is determined whether or not the character represents the axis unit of the graph. If the character does not represent the axis unit of the graph, the process goes to step S707.

On the other hand, in step S704, if the GRAPHIC adjacent to the character is a graph, it is determined whether or not the character represents the vertical axis unit of the graph.

If the character represents the vertical axis unit of the graph, in step S705, the process lays out each of the enlarged vertical axis units to the vertical axis 601 from a position at which the original character is present to a position on the left side in the horizontal direction, particularly, to a position which is prevented from crossing the axis and which is shifted in the vertical direction to the axis.

If the character represents the horizontal axis unit of the graph, in step S706, the process determines to lay out each of the enlarged horizontal axis units to the horizontal axis 603 from a position at which the original character is present to a position on the lower side in the vertical direction. Particularly, the process lays out the horizontal axis units from the original position to a position which is prevented from crossing the axis and which is shifted in the vertical direction to the axis.

In step S707, it is determined whether or not the characters represent the item of the graph (e.g., the item for showing that a polygonal line in a line chart is what data). If it is determined that the characters do not represent the graph item, the processing is terminated. On the other hand, if it is determined that the characters represent the graph item, in step S708, the process determines to lay out each of the enlarged items to a position which is adjacent to the polygonal line corresponding to each of the items and which is not close to the other polygonal lines. That is, the process determines the layout position such that the distance from a character position of the item to each of the polygonal lines is found and the polygonal line gets closest to the item. There is the possibility that when the characters (characters composing an axis or characters composing an item for showing that a graph is what data content) composing the graph are enlarged, the graph becomes meaningless in enlarging the characters without any consideration of the graph. To cope with the above, in the present embodiment, the process lays out the enlarged characters so that users may understand the contents shown by the graph (namely, to distinguish the contents of the graph) even if the characters are enlarged, as described above.

4. Graphic Determination Process

The graphic determination process shown in step S702 according to the present invention will be described below with reference to FIG. 8.

First, in step S801, the process recognizes the vertical axis and the horizontal axis in the graph. Here, among the line drawing objects recognized in step S402, one vertical line is recognized as the vertical axis 601 and another horizontal line is recognized as the horizontal axis 603 in lines perpendicular to each other.

Next, in step S802, the process recognizes the vertical axis unit. Among the character objects recognized in step S402, the character string adjacent to the vertical axis 601 is recognized as the vertical axis unit 602.

Next, in step S803, the process recognizes the horizontal axis unit. Among the character objects recognized in step S402, the character string adjacent to the horizontal axis 603 is recognized as the horizontal axis unit 604.

Subsequently, in step S804, the process recognizes the polygonal lines. Among the line drawing objects recognized in step S402, line drawings adjacent to the vertical axis 601 and/or the horizontal axis 603 are recognized as the polygonal lines 605 and 606.

Next, in step S805, the process recognizes the items. Among the character objects recognized in step S402, characters adjacent to the polygonal lines 605 and 606 are recognized as the items 607 and 608.

Figure 9:
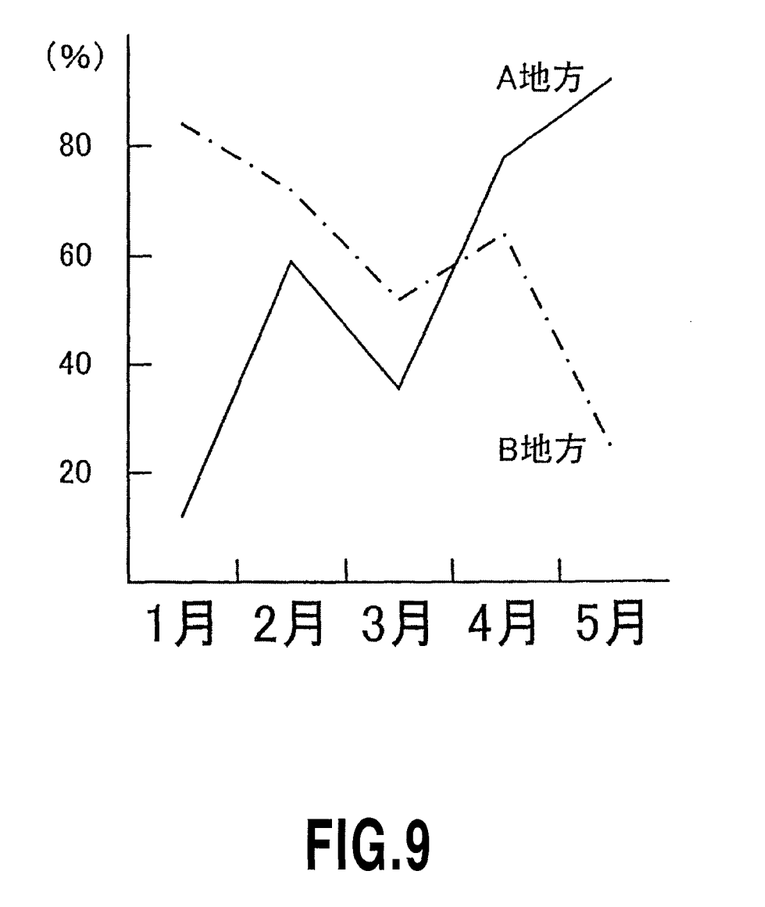
FIG. 9 is a view showing one example of a graph after the process of the image processing system according to the first embodiment.

From the above, it can be determined whether or not, when reading the original document of FIG. 5, a character size of each unit composing the horizontal axis unit 604 in the graphic area 502 of the original document is smaller than the predetermined character size and it is difficult to recognize characters in the image data 501. If it is difficult to recognize the characters, each character size of the horizontal axis unit 604 can be enlarged to a predetermined size capable of the recognition, and moreover, the characters can be arranged according to the layout acting as the horizontal axis unit of the graph, as shown in FIG. 9.

The layout determination process according to the present embodiment can deal with not only the horizontal axis unit 604 but also the vertical axis unit 602 and the items 607 and 608 by the same processing method.

Figure 10:
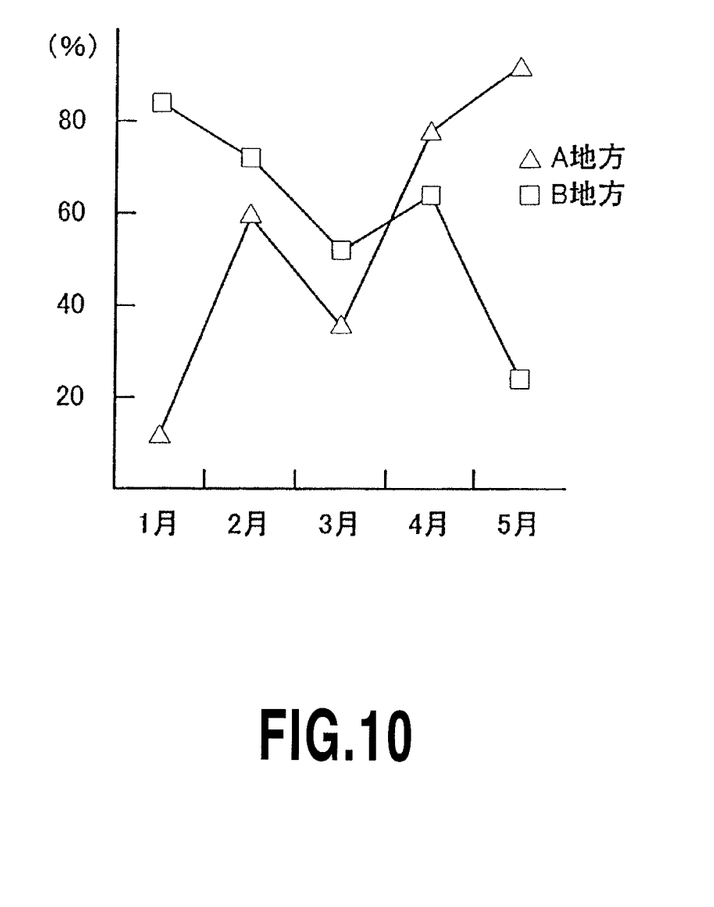
FIG. 10 is a view showing one example of the graphic area according to the first embodiment.

Further, as shown in FIG. 10, the line chart according to the present embodiment shows contents not by types of lines but by a legend graphic such as Δ and □ in some times. Even in that case, a size of the legend graphic is stored in the data processing unit 206 as a predetermined recognizable size in place of the character size, and thereby the same effect can be obtained.

In the present embodiment, the case where the GRAPHIC adjacent to the characters is a line chart is shown; however, a type of the graph is not limited thereto. When the graph has the vertical axis, the horizontal axis, and each of the axis units, it can be recognized using the same processing method as that of FIG. 8.

Further, predetermined values of the character size stored in the data processing unit 206 may be set from the display device 207 by a user.

Second Embodiment

Hereinafter, another embodiment according to the present invention will be described in detail with reference to FIG. 11.

In the first embodiment, there is shown the case where it is difficult to recognize small characters in the reading original document. In the second embodiment, the following case will be described. That is, when the reduction function is carried out by the scaling section 302 in the image processor in the data processing unit 206 of the MFP 100, the small character which is difficult to be recognized in a reduced original document is determined.

The reduction herein indicates the case where image data in the original document is uniformly reduced by a reduction rate previously set before reading the original document, or the case where a reduction layout is set. The reduction layout means that $2^n$ original documents are laid out into one output sheet to be printed; it is called as 2in1 and 4in1.

Figure 11:
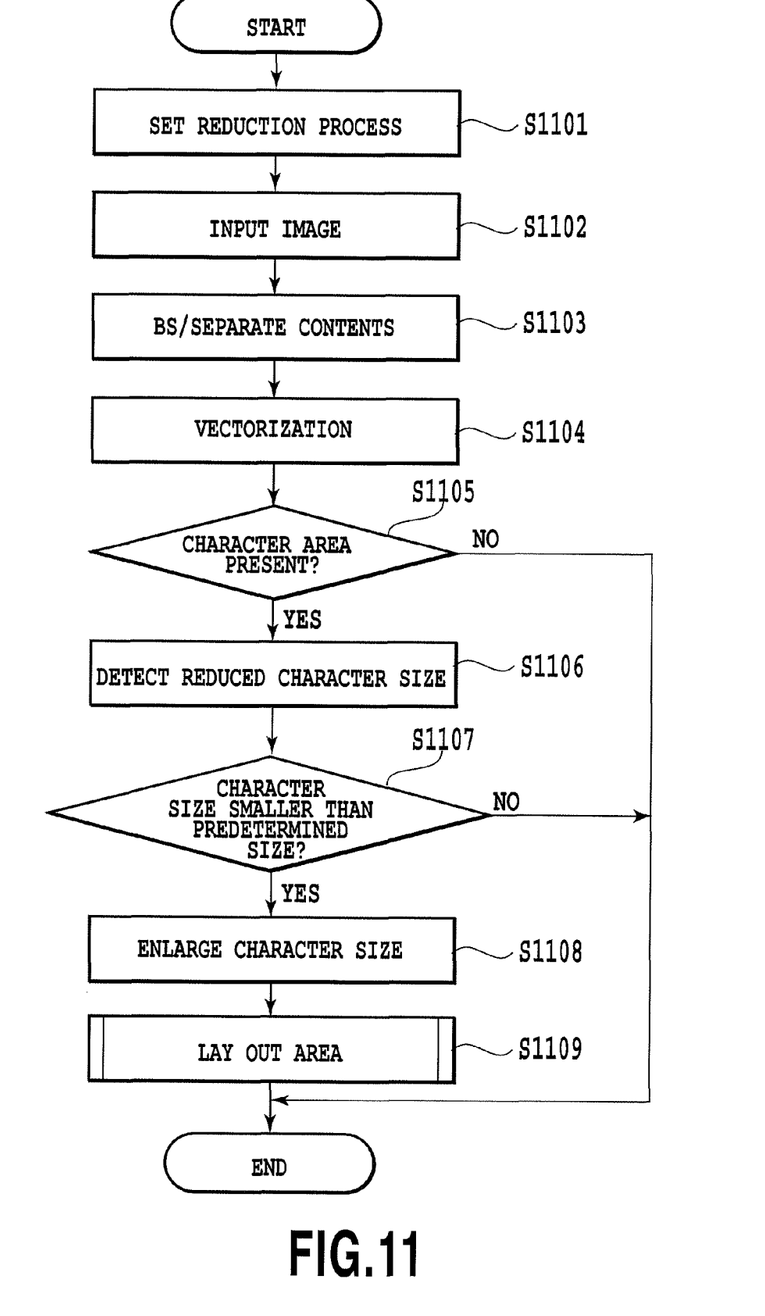
FIG. 11 is a flowchart of a process of an image processing system according to a second embodiment.

Referring to FIG. 11, in step S1101, the reduction process is set. Steps S1102 to S1105 following the above step are the same as steps S401 to S404 of FIG. 4 and therefore, the description is omitted.

Continuously, in step S1106, a character size after the reduction is calculated. As a result of the calculation, in step S1107, it is determined whether the character size after the calculation is no less than the predetermined character size. If the character size is smaller than the predetermined character size, the character size is enlarged up to the predetermined size. At the same time, the image data of the original document set in step S1101 is subjected to the reduction process (step S1109) and the layout of the area is performed in step S1109. At this time, the layout determination process (FIG. 7) as same as that of the first embodiment is carried out.

(Others)

Figure 12:
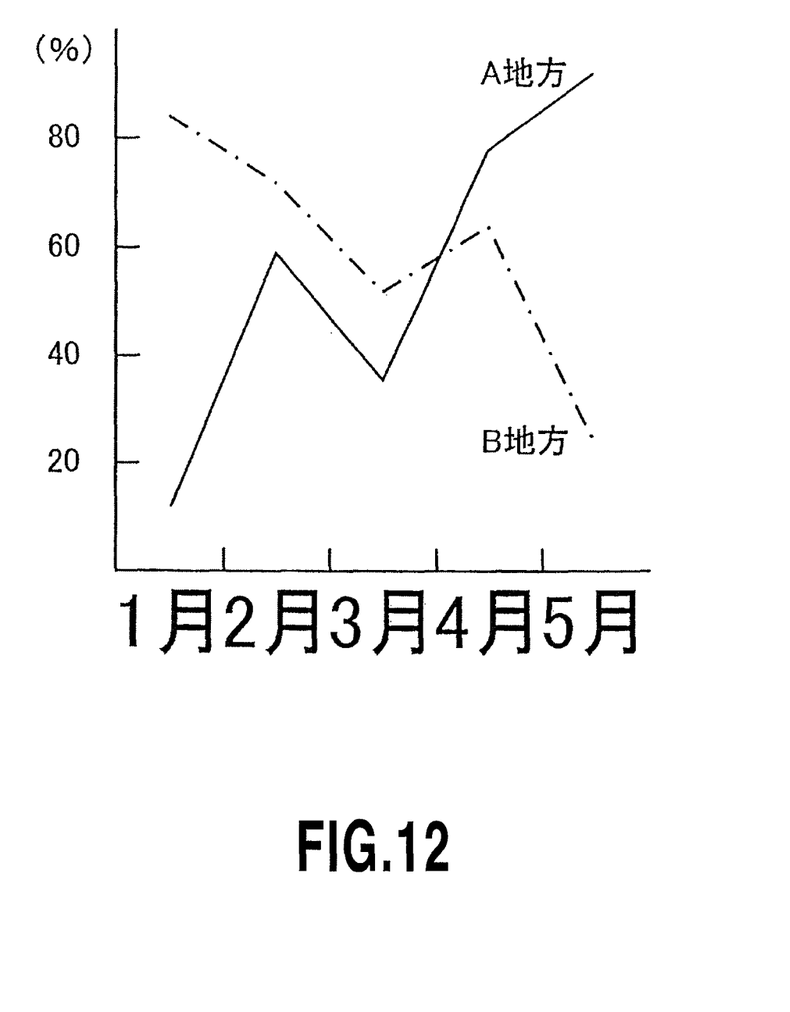
FIG. 12 is a view showing one example of the graph after the process of the image processing system according to the first embodiment.

In an alternative embodiment, the case is considered that each character size of the horizontal axis unit 604 is enlarged up to the predetermined character size and as a result, the size is larger than the character size of FIG. 9 and further, no less than the character size of FIG. 12. In this case, a margin between the units disappears. When further expansion is needed, the characters overlap each other and recognition of users is disturbed. When the characters are moved not to be overlapped, the layout is changed from a layout acting as the horizontal axis unit of the graph.

To cope with the above, as a result of the expansion of the character, when the distance between the axis units is smaller than a predetermined distance previously stored in the data processing unit 206, the character size is not enlarged to such a character size or more that the distance may become smaller than the predetermined distance.

Figure 13:
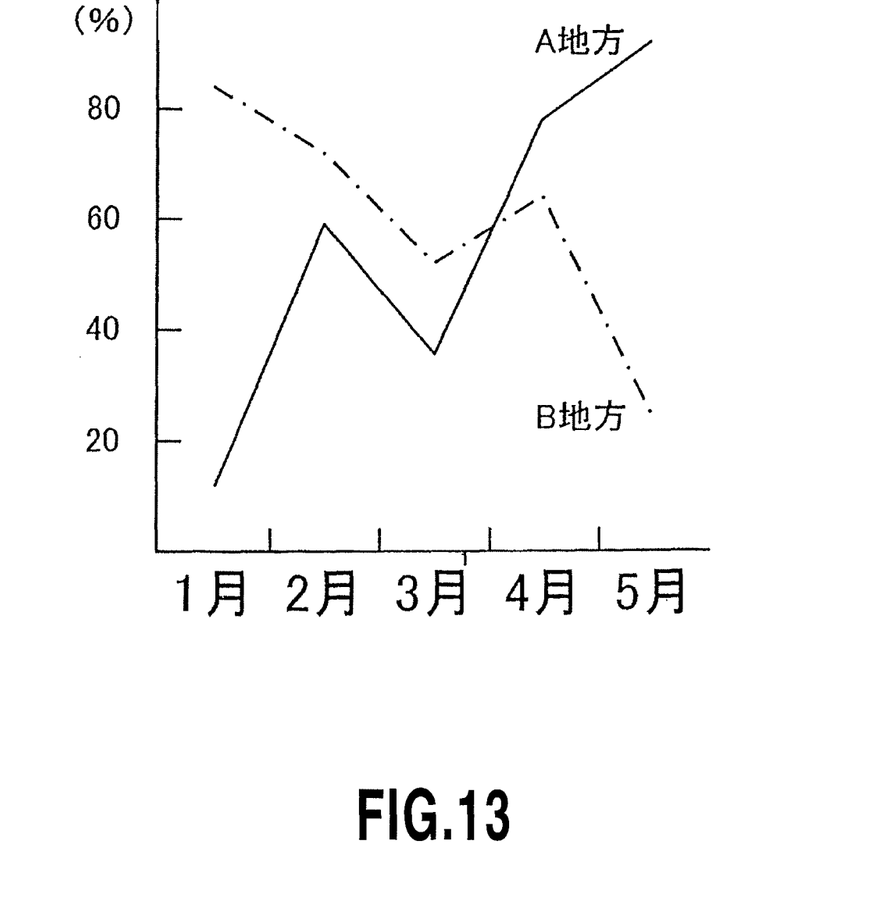
FIG. 13 is a view showing one example of a graph after a process of an image processing system according to another embodiment.

Further, in an alternative embodiment, as a result of the expansion, when the character size does not reach the predetermined character size, the adjacent GRAPHIC is enlarged. Thereby, the characters can be recognized as a character as shown in FIG. 13. Moreover, the characters can be arranged by the layout acting as the horizontal axis unit of the graph.

Further, in a variation where the second embodiment is modified, as a result of the expansion, when the character size does not reach the predetermined character size, restrictions are put on the reduction rate set in step S1101. When the reduction is not performed to the restriction or less, the same function is realized.

Other Embodiments

As described above, the present invention may be applied to a system composed of a plurality of devices (e.g., a host computer, an interface device, a reader and a printer) or may be applied to an apparatus including a single device (e.g., a copy machine and a facsimile machine).

The present invention also includes a case where to make various devices operative so as to realize the functions of the above embodiment, software program codes for realizing the functions of the above embodiment are supplied to a computer in an apparatus or system connected to those various devices, and the various devices are made operative in accordance with a program stored in the computer (CPU or MPU) of the system or apparatus.

In this case, the software program codes themselves realize the above embodiment functions. Therefore, the program codes themselves and means for supplying such program codes to a computer, e.g., a computer readable storage medium storing such program codes, constitute the present invention.

As a storage medium storing such program codes, for example, a floppy (trademark) disk, a hard disk, an optical disk, a magneto-optical disk, a CD-ROM, a magnetic tape, a non-volatile memory card, and a ROM can be utilized.

Obviously, such program codes are included in the embodiment of this invention, not only for the case wherein the above embodiment functions are realized by executing the program codes supplied to the computer but also for the case wherein the above embodiment functions are realized by the program codes in cooperation with an OS (operating system) running on the computer or with other application software.

Obviously, the present invention further includes the case where after the supplied program codes have been stored in a memory which is provided in a function expansion board included in the computer or in a function expansion unit connected to the computer, a CPU or the like provided in the function expansion board or the function expansion unit can execute all or part of the actual processing based on the instructions of the program codes to realize the functions of the above embodiments by the processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-321282, filed Dec. 12, 2007, which is hereby incorporated by reference herein in its entirety.

What is claimed is:

1. An image processing apparatus, comprising:
    detection means for detecting character images included within an original document image and sizes of the character images;
    determination means for determining whether or not the sizes of the detected character images are smaller than a predetermined size;
    enlargement means for enlarging the sizes of the character images determined to be smaller than the predetermined size by said determination means; and
    layout means for, in a case that an object adjacent to the character images is a graph and the character images are scale characters to an axis of the graph, controlling said enlargement means to enlarge the sizes of the character images on a condition that each margin between the enlarged character images is not smaller than a predetermined distance, and laying out the enlarged character images at positions shifted in a direction perpendicular to the axis of the graph, wherein, in a case that the sizes of the enlarged character images do not reach the predetermined size when said enlargement means enlarges the sizes of the character images on the condition that each margin between the enlarged character images is not smaller than the predetermined distance, said layout means further controls said enlargement means to enlarge the graph.

2. The image processing apparatus according to claim 1, further comprising
    reduction means for reducing the original document image, wherein:
    when said reduction means reduces the original document image, said detection means detects the character images included within the reduced original document image and the sizes of the character images included within the reduced original document image.

3. The image processing apparatus according to claim 1, wherein:
    when the character images are item characters showing data contents of said graph, said layout means lays out said enlarged character images at a position adjacent to a data corresponding to the item.

4. A method of processing an image, comprising the steps of:
    detecting character images included within an original document image and sizes of the character images;
    determining whether or not the sizes of the detected character images are smaller than a predetermined size;
    enlarging the sizes of the character images determined to be smaller than the predetermined size in the determination step; and
    controlling, in a case that an object adjacent to the character images is a graph and the character images are scale characters to an axis of the graph, said enlargement step to enlarge the sizes of the character images on a condition that each margin between the enlarged character images is not smaller than a predetermined distance, and laying out the enlarged character images at positions shifted in a direction perpendicular to the axis of the graph, wherein, in a case that the sizes of the enlarged character images do not reach the predetermined size when said enlarging step enlarges the sizes of the character images on the condition that each margin between the enlarged character images is not smaller than the predetermined distance, said enlarging step is further controlled to enlarge the graph.

5. A non-transitory computer readable medium storing a program for causing a computer to execute the steps of:

detecting character images included within an original document image and sizes of the character images;

determining whether or not the sizes of the detected character images are smaller than a predetermined size;

enlarging the sizes of the character images determined to be smaller than the predetermined size in the determination step; and controlling, in a case that an object adjacent to the character images is a graph and the character images are scale characters to an axis of the graph, said enlargement step to enlarge the sizes of the character images on a condition that each margin between the enlarged character images is not smaller than a predetermined distance, and laying out the enlarged character images at positions shifted in a direction perpendicular to the axis of the graph, wherein, in a case that the sizes of the enlarged character images do not reach the predetermined size when said enlarging step enlarges the sizes of the character images on the condition that each margin between the enlarged character images is not smaller than the predetermined distance, said enlarging step is further controlled to enlarge the graph.

\* \* \* \* \*